United States Patent [19]

van Der Lely et al.

[11] Patent Number: 4,884,640
[45] Date of Patent: Dec. 5, 1989

[54] SOIL CULTIVATING IMPLEMENTS

[75] Inventors: Ary van Der Lely, Maasland; Cornelis J. G. Bom, Rozenburg, both of Netherlands

[73] Assignee: C. van der Lely N.V., Maasland, Netherlands

[21] Appl. No.: 263,972

[22] Filed: Oct. 27, 1988

Related U.S. Application Data

[63] Continuation of Ser. No. 797,498, Nov. 13, 1985, abandoned.

[30] Foreign Application Priority Data

Nov. 13, 1984 [NL] Netherlands ............... 8403460

[51] Int. Cl.$^4$ .............................................. A01B 49/02
[52] U.S. Cl. .................................... 172/68; 172/117; 172/611; 172/677
[58] Field of Search ............... 172/47, 68, 49.5, 59, 172/111, 677, 117

[56] References Cited

U.S. PATENT DOCUMENTS

| | | | |
|---|---|---|---|
| 2,691,334 | 10/1954 | Cannon | 172/611 |
| 3,358,777 | 12/1967 | Groenke | 172/677 |
| 3,902,437 | 9/1975 | van der Lely | 172/68 |
| 3,983,943 | 10/1976 | van der Lely | 172/47 |
| 4,051,902 | 10/1977 | van der Lely | 172/68 |
| 4,059,160 | 11/1977 | van der Lely | 172/68 |
| 4,099,575 | 7/1978 | van der Lely | 172/117 |
| 4,114,695 | 9/1978 | van der Lely | 172/47 |
| 4,124,078 | 11/1978 | van der lely | 172/117 |
| 4,136,741 | 1/1979 | Rambach | 172/677 |
| 4,335,790 | 6/1982 | van der Lely | 172/117 |
| 4,412,588 | 11/1983 | van der Lely | 172/68 |

FOREIGN PATENT DOCUMENTS

2749656 5/1978 Fed. Rep. of Germany ........ 172/68

Primary Examiner—Richard J. Johnson
Attorney, Agent, or Firm—Penrose Lucas Albright; Robert A. Miller

[57] ABSTRACT

A soil cultivating implement comprising a row of power-drivable, soil working members supported by a hollow frame extending substantially horizontally perpendicular to the implement's intended direct of operative travel to provide selectively upwardly or downwardly directed forces upon that row via the hollow frame. A supporting ground roller is connected behind the row, its rotary axis being contained in an imaginary vertical plane. A mobile implement provides mass to exert a downward force on the cultivating implement at a coupling point which, in turn, is translated into an upward force on the frame's forward aspect by way of arms and strong pivots, such arms being turnable about the ground roller's rotary axis. The upwardly directed force assists soil-working members automatically to elevate as needed for riding over rocks or other buried obstacles without significant damage. In alternative embodiments, the mass's point of application is adjustable to a location in advance of the imaginary vertical plane whereby the force acting on the frame and soil working members is directed downwardly. This helps to work hard, heavy soils because it facilitates initial soil penetration by the working members and tends to prevent them from riding upwardly from the soil. In another embodiment, the mass comprises weights that are adjustably angularly displaceable around the ground roller's rotary axis to locations spaced at different distances from that axis and either behind or in front of such vertical plane.

25 Claims, 3 Drawing Sheets

SOIL CULTIVATING IMPLEMENTS

This is a continuation of application Ser. No. 797,498, filed Nov. 13, 1985, now abandoned.

SUMMARY OF THE INVENTION

This invention relates to soil cultivating implements or machines of the kind which comprise a frame portion that is movable over the ground and that extends substantially horizontally perpendicular, or at least transverse, to the intended direction of operative travel of the implement or machine, a plurality of rotary soil working members carried by said frame portion in successively, neighboring relationship with one another, and a supporting member which sustains said frame portion from the ground surface during operation of the implement or machine, the supporting member being located rearwardly of the soil working members relative to said direction of operative travel and also extending substantially horizontally perpendicular, or at least transverse, to that direction. The terms "implement" and "implements" are intended to include "machine" and "machines," respectively; throughout the remainder of this document for the sake of brevity.

Should an implement of the known kind mentioned above encounter a large, hard, buried obstacle, such as a rock, during its operation, its soil working members, and even the drive transmission thereto, may be broken, bent or otherwise seriously damaged. In addition, when cultivating heavy soil in a hard condition, initial penetration of tines or other tools of the soil working members into the ground may be difficult to achieve and there is sometimes a tendency for those members to ride up out of such soil as the work continues. An object of the present invention is to enable the disadvantages of known implements of the kind discussed above to be overcome, or at least significantly reduced, and, accordingly, ther is provided a soil cultivating implement of the kind set forht, characterized in that means is provided by which a mass can exert, by way of said supporting member, a force upon said frame portion, which force has either an upwardly or a downwardly acting component. Depending upon the nature and condition of the soil to be cultivated, it is thus possible to exert an upwardly acting force upon the frame portion and soil working members so that the latter will more readily rise in response to encountering an embedded obstacle, and to pass over some without significant damage, should such an obstacle be encountered during operation. Conversely, when very hard and heavy soil is to be tilled, a downwardly acting force can be exerted on the frame portion and soil working members to assist initial penetration of the latter into the ground and to tend to prevent their upward disengagement therefrom.

For a better understanding of the invention, and to show how the same may be carried into effect, reference will now be made, by way of example, to the accompanying drawings in which.

BRIEF DESCRIPTION OF THE DRAWINGS

DESCRIPTION OF THE PREFERRED EMBODIMENTS

Figure 1:
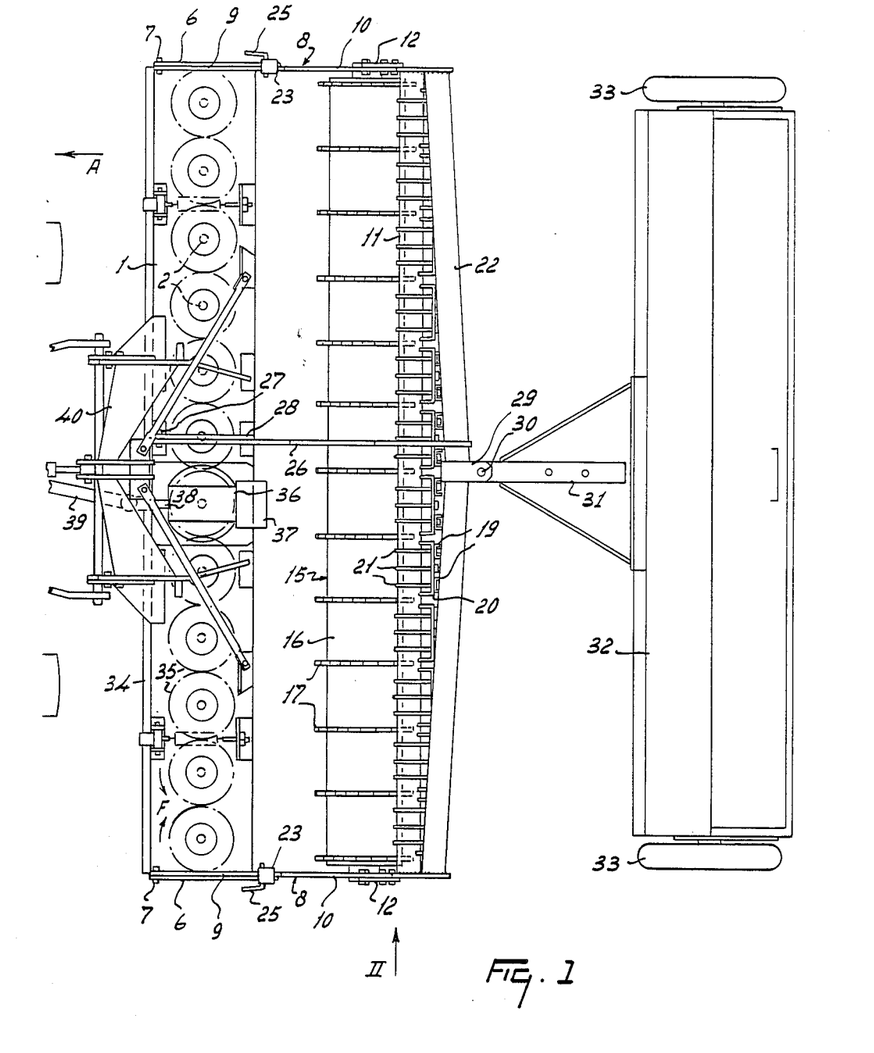
FIG. 1 is a somewhat diagrammatic plan view of a soil cultivating implement constructed in accordance with the invention which is illustrated connected to the rear of an agricultural tractor, the implement being arranged in combination with a seed drill.
Figure 2:
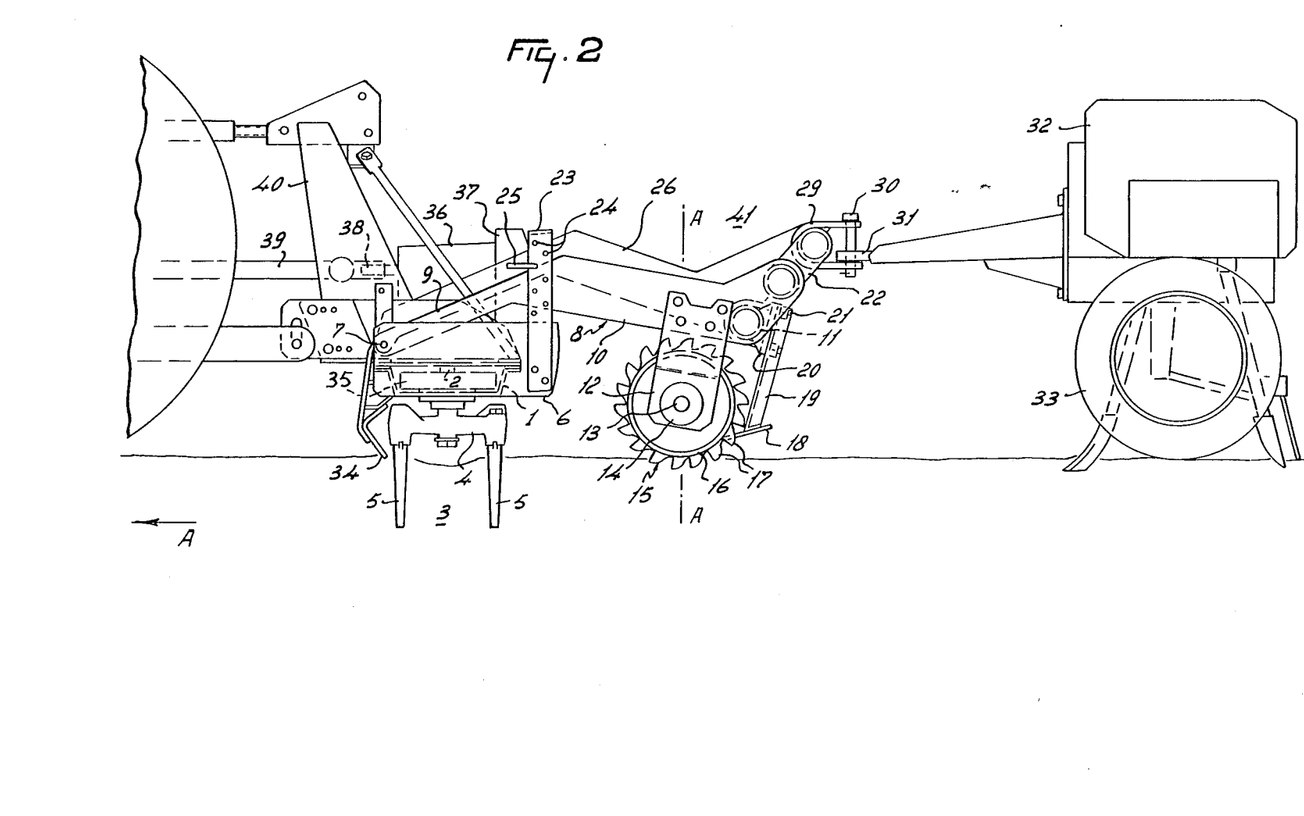
FIG. 2 is a side elevation, to an enlarged scale as seen in the direction indicated by an arrow II in FIG. 1.
Figure 3:
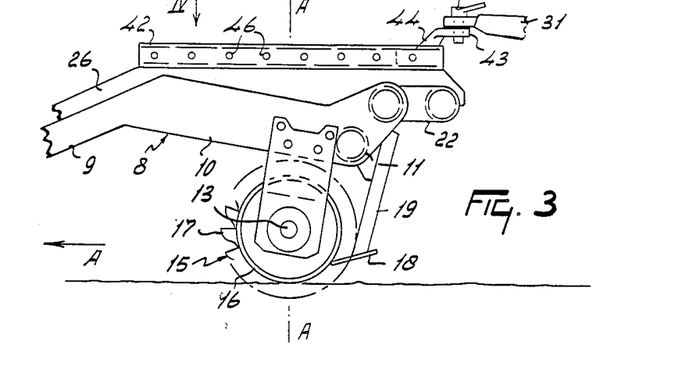
FIG. 3 is a similar view to a central region of FIG. 2 but illustrates an alternative construction.

Referring to the accompnaying drawings and firstly to FIGS. 1 and 2 thereof, the soil cultivating or tilling implement that is illustrated therein is in the form of a rotary harrow that is intended principally, but not exclusively, for the preparation of seed beds in previously worked agricultural soil. The implement has a hollow box-section frame portion 1 that extends substantially horizontally transverse and usually, as illustrated, substantially horizontally perpendicular, to the intended direction of operative travel of the implement that is indicated in FIGS. 1, 2 and 3 of the drawings by an arrow A. The top and bottom of the hollow frame portion 1 carry bearings in which a plurality, of which there are twelve in the example that is being described, of substantially vertical, or at least upwardly extending, shafts 2 are rotatably mounted with the axes of rotation of the twelve shafts 2 parallel to one another and spaced apart at regular intervals which advantageously, but not essentially, each have a magnitude of substantially twenty-five centimeters.

Each shaft 2 has a portion which projects downwardly from beneath the bottom of the hollow frame portion 1 and this downwardly projecting shaft portion has the hub of a corresponding soil working member, that is generally indicated by reference numeral 3, fastened to it in a secure but releasable manner. Each soil working member 3 comprises a substantially horizontal carrier 4 exhibiting arms which project substantially radially in opposite directions from the hub of that member 3. The outer ends of these carrier arms are integrally or rigidly provided with substantially vertically extending sleeve-like holders in which upper fastening portions of soil working tools in the form of tines 5 are firmly but releasably secured. Each tine 5 also has a downwardly tapering soil working portion that trails downwardly from top to bottom by a few degrees with respect to the intended direction of operative rotation of the soil working member 3 in question. As an alternative, the soil working tools may be in the form of somewhat resilient blade-like tines.

The opposite ends of the hollow frame portion 1 are closed by corresponding side plates 6 which are substantially vertically parallel to one another and to the direction A, each side plate 6 being larger in area than the otherwise open end of the hollow frame portion 1 with which it co-operates and being arranged to project both vertically above the substantially flat top of the hollow frame portion 1 and rearwardly behind that frame portion 1 with respect to the direction A. In addition, the lower edges of the side plates 6 are beneath the bottom of the frame portion 1 and the upper region of each side plate 6 that projects above the top of the same frame portion 1 has a vertical height which is a little more than half the total vertical height of that frame portion.

Upper leading regions of the two side plates 6 which are disposed at some distance above the front edge of the hollow frame portion 1 are provided with corresponding strong pivots 7 which are substantially horizontally aligned in a direction parallel to the transverse length of the hollow frame portion 1 and each pivot 7 has the leading end of a corresponding arm 8 turnably mounted on it in such a way that said arm 8 extends generally rearwardly with respect to the direction A, from the pivot 7 concerned. Arm 8 extends from the inboard side of the corresponding plate 6 which faces the center of the implement, the rearmost ends of the two arms 8 being located well behind the frame portion 1 and behind the rear edges of its side plates 6. In fact, each arm 8 comprises a straight leading portion 9 that extends rectilinearly obliquely upwardly and rearwardly away from its respective pivot 7 to pass just behind, with respect to the direction A, the curved rearmost edge of the neighboring side plate 6 where it then merges integrally, by way of an angular junction, into a second straight arm portion 10 which projects farther rearwardly with a gentle downward inclination to the horizontal, each portion 10 having a considerably greater vertical dimension than does the corresponding arm portion 9. Each arm portion 10 terminates in a relatively short upwardly and rearwardly inclined extremity.

The rearmost ends of the two straight portions 10 of the arms 8 are interconnected, at substantially the locations at which those arm portions 10 merge into their rearmost extremities, by a tubular supporting beam 11 that is substantially horizontally parallel to the row of twelve soil working members 3 and to the substantially horizontal axis defined by the strong pivots 7. Substantially, although not exaclty, oblong rectangular support plates 12 have their upper ends secured to the outer surfaces of the arm portions 10 at locations just in advance of the supporting beam 11, with respect to the direction A. The support plates 12 project downwardly from the arm portions 10 in vertical, or substantially vertical, relationship with the lengths of those arm portions 10 and substantially horizontally aligned bearing housings 14 mounted close to the lower ends of the two support plates 12 accommodate corresponding horizontal bearings in which stub shafts 13 at the opposite ends of a ground roller 15 are received in a freely rotatable manner. The ground roller 15 affords a supporting member of the implement by which that implement is partly sustained from the ground surface.

In the example that is being described, the ground roller 15 is in the form of a so-called "packer" roller and comprises a circular cross section cylinder 16 upon the outer surface of which rows of outwardly projecting tooth-like blades 17 are mounted. As can be seen in FIG. 1 of the drawings, the blades 17 are arranged in groups or crowns around the roller cylinder 16 in a regularly spaced apart relationship along that cylinder and with two such groups or crowns very close th the opposite ends of the cylinder. Preferably, each group or crown of blades 17 is angularly staggered around the longitudinal axis of the roller 15 by a few degrees relative to its immediate neighbors so that the longitudinally extending rows of said blades 17 are wound helically around the cylinder 16 to some extent. Preferably, the groups or crowns of blades 17 are spaced apart from one another by substantially the same distances as are the longitudinal axes of immediately neighboring shafts 2 and thus, in the example that is being described, preferably by distances of substantially twenty-five centimeters.

Three scrapers 18 are arranged to co-operate with the curved surface of the roller cylinder 16 between each neighboring pair of groups or crowns of blades 17, the leading effective edges of the scrapers 18 preferably being located very closely adjacent to, rather than in actual contact with, the cylinder surface. The scrapers 18 prevent the adherence of mud, clods of earth, weeds, plant debris and the like for any length of time and facilitate effective operation of the roller 15 even on wet and heavy soil and/or soil containing many weeds or other plant remnants. Each scraper 18 is mounted on two supporting arms 19 which extend upwardly and rearwardly from the scraper 18 concerned to their upper relatively spaced apart ends (see FIG. 1) where they are secured to a common clamping member 20 of channel-shaped configuration the recessed limbs of which engage the rear of the tubular supporting beam 11, each clamping member 20 being secured to beam 11 by three U-bolts 21 having rearwardly projecting screw-threaded limbs which receive nuts at the back of the respective clamping member 20. Nuts of the U-bolts 21 particularly the lower nuts can be positioned on their respective limbs in a manner to permit a jammed stone or the like to turn the scraper assembly concerned in a counter clockwise direction about the longitudinal axis of the beam 11 as seen in FIG. 2 of the drawings, before any significant damage is caused.

The tops of the upwardly and rearwardly inclined rearmost extremities of the arm portions 10 are interconnected by a tubular support 22 of very shallow V-shaped configuration (see FIG. 1), the point of the V being located midway between the general planes of the two arms 8 and an imaginary plane which contains the point of the V and the longitudinal axes of both its limbs being inclined upwardly and rearwardly, with respect to the direction A, from the leading ends of those two limbs.

The portions of the two frame portion side plates 6 that project rearwardly of the remainder of that frame portion 1 with respect to the direction A have corresponding guides 23 fastened to them. Each guide 23 is in the form of a strip-construction forked bracket having limbs which are closely adjacent to one another and are interconnected, at their upper ends, by a narrow "base". The two limbs of each guide 23 are located at relatively opposite sides of the co-operating frame portion side plate 6 and the portions of those limbs which engage the side plates are firmly secured thereto by, for example, a pair of bolts. Each arm 8 also passes between the two strip-shaped limbs of a corresponding one of the two guides 23 in the region of the integral junction between the two straight portions 9 and 10 of that arm 8 and it will be seen from FIG. 2 of the drawings that, towards their leading and rear edges, respectively, the two limbs of each guide 23 are formed with corresponding rows of holes 24 with the holes in each row staggered between those of the other row as regards their vertical levels. Horizontal locking pins 25, or equivalent stop bolts or the portion, can be entered through chosen holes 24 in the two limbs of each guide 23 at locations above the upper edges of the respective arms 8 to control the maximum depth of penetration of the tines 5 of the soil working members 3 into the ground which is possible by preventing the frame portion 1 and soil working members 3 from moving downwardly closer to the ground surface beyond a level at which said pins 25 or the like bear against the upper edges of the arms 8, the latter being sustained from the ground surface by the supporting ground roller 15. In other words, the extent to which the frame portion 1 and soil working members 3 can turn about the axis defined by the aligned strong pivots 7 in a clockwise direction as seen in FIG. 2 of the drawings is limited by the engagement of the pins 25 with the upper edges of the arms 8.

A third arm 26 that is similar, although not identical, in shape to that of each of the arms 8 has its uppermost and rearmost end secured to the tubular support 22 at a location spaced a short distance to one side of the point of the V-shape of that support. The leading end of said third arm 26 is turnable upwardly and downwardly about a pivot pin 27 aligned with the two strong pivots 7 that is carried by a substantially vertically disposed plate 28 which is parallel to the direction A and that rigidly interconnects horizontal plates fastened on top of the hollow frame portion 1 alongside its respective leading and rear edges.

A forked coupling bracket 29 has upper and lower limbs which project rearwardly from the tubular support 22 at substantially the shallow V-shaped point of that support 22, the upper and lower limbs therefore being formed with vertically aligned holes through which a vertical pivotal hitch pin 30 can be releasably entered turnably to connect a coupling eye at the leading end of a draw bar 31 to the coupling bracket 29. This arrangement enables some other implement, tool or machine that may be intended to be used in combination with the soil cultivating implement to be connected to the latter and, in the example that is being described, the draw bar 31 is part of a diagrammatically illustrated seed drill 32 that has large pneumatically tired ground wheels 33 that rotate during operative progress in the direction A. Seed drill 32 is arranged to deliver seeds at a controlled rate to colters which place seeds in furrows that are opened in the cultivated soil by the seed drill, said furrows being closed again after seeds have been sown.

A protective member or shield 34 extends substantially horizontally throughout the working width of the soil cultivating implement at substantially the level of the carriers 4 of its soil working members 3 and immediately in advance of those carriers 4 with respect to the direction A. The protective member 34 is afforded principally by a beam or bar of L-shaped or other similar angular cross section. The protective member 34 is carried by spring-loaded pivotal arms that depend from the frame portion 1 and can move forwardly, against the action of the springs, to release any stone or the like that becomes jammed between the member 34 and at least one of the soil working members 3.

The principal purpose of the protective member 34 is to prevent large stones and other hard objects on, or near to, the ground surface from contacting the carriers 4 of the soil working members 3 and, in particular, from penetrating between the tops of those carriers 4 and the lower surface of the frame portion 1. A hard stone trapped between two contra-rotating soil working member carriers 4 and/or between those members and the bottom of the hollow frame portion 1 can cause significant damage sometimes neccessitating the replacement of broken parts. The occurrence of such stones in previously worked agricultural soil is usually relatively low and the provision of the protective member 34 will almost always deflect such an enountered stone downwardly into the ground to a level beneath that of the soil working member carriers 4.

Each shaft 2 is provided, inside the hollow frame portion 1, with a corresponding straight- or spur-toothed pinion 35, the sizes of said pinions 35 being such that the teeth of each of them are in mesh with those of the immediately neighboring pinion or pinions 35 in the single row of the twelve such pinions which are provided in the example that is being described. With this arrangement, each pinion 35, shaft 2 and soil working member 3 will revolve during the operation of the implement in the opposite direction to each immediately neighboring similar assembly as indicated by small arrows F in FIG. 1 of the drawings for two such neighboring assemblies. The shaft 2 corresponding to one of the center pair of soil working members 3 in the single row of twelve such members 3, has an upward extension through the top of the hollow frame portion 1 into a gear box 36 that is mounted on the frame portion 1 beneath parts of a coupling member or trestle 40 that will be referred to again below. The gear box 36 has a rotary input shaft 38 which projects substantially horizontally forwards from the front thereof in substantially the direction A where it is splined or otherwise keyed to enable it to be placed in driven connection with the rear power take-off shaft of an agricultural tractor or other operating vehicle by way of an intermediate telescopic transmission shaft 39 of known construction having universal joints at its opposite ends. Shafts and bevel pinions (not visible) within the gear box 36 place the rotary input shaft 38 thereof in driving connection with the upward extension of said one of the shafts 2 and this driving connection is by way of a change-speed gear 37 that is mounted at the back of the gear box.

The change-speed gear 37 is not the subject of the present invention and it suffices to say that, beneath a readily removable cover thereof, the splined or otherwise keyed ends of two parallel shafts are accessible and receive a co-operating pair of straight- or spur-toothed pinions having a meshing relationship with one another which establishes a pre-determined transmission ratio between the two shafts. The two pinions can be interchanged on the shaft ends or be exchange for at least one alternative pair of co-operating pinions of different sizes to give any one of a number of different transmission ratios. The particular transmission ratio which is established in the change-speed gear 37 determines the speed at which all of the soil working members 3 will revolve in response to a substantially fixed speed of rotation applied to the rotary input shaft 38 of the gear box 36.

The top and front of the frame portion 1, with respect to the direction A, is provided midway across its transverse width with the coupling member or trestle 40 that has been referred to above and that is constructed and arranged for connecting the implement to a three-point lifting device or hitch at the rear of an agricultural tractor or other operating vehicle in a manner which is known per se, the position of such a tractor or other vehicle being indicated at the left of FIG. 1 of the drawings by the rear portions of its rear tires are the rear end portions of the lifting links of its lifting device.

As the soil working implement and seed drill combination is moved operatively in the direction A by the tractor or other vehicle to which the lifting device or hitch, the coupling member or trestle 40 is connected, each soil working member 3 is operatively rotated in the opposite direction to its immediate neighbors by drive derived from the rear power take-off shaft of the same tractor or other vehicle at a speed which will be dependent upon the particular transmission ratio previously established in the change-speed gear 37. It may also be necessary, before work commences, to change the maximum depth to which the tines 5 of the soil working members 3 can penetrate into the soil by displacing the locking pins 25 or the like to different holes 24 in the guides 23. These adjustments will usually be made in the light of the nature and condition of the soil that is to be cultivated by the implement and the particular purpose for which that soil is required after its cultivation. The rotating soil working members 3 work individual strips of land that extend in the direction A but, since the effective working width of each member 3 is the same as, or a little greater than, the spacing between the axes of rotation of immediately neighboring shafts 2, these strips of land will overlap, or at least adjoin, one another to produce a single broad strip of worked soil that, in the example which is being described, will have a width of substantially, although not necessarily exactly, three meters.

If, exceptionally, at least one of the soil working members 3 should encounter an obstacle buried in the soil, such as a large embedded rock, the upwardly displacing force which is exerted on the soil working member or members 3 concerned can force the frame portion 1 and the soil working members 3 upwardly, such upward displacement being in a counter clockwise direction relative to arms 8 as seen in FIG. 2 of the drawings, the relative displacement of frame portion 1 with respect to arms 8 being about the axis defined by the aligned strong pivots 7 and the intervening pivot pin 27, the pins 25 or the like being moved upwardly out of contact with the upper edges of the arms 8 under such circumstances. In accordance with a feature of the invention, a mass is located behind a vertical plane A—A that contains the axis of rotation of the ground roller 15 and will exert a substantially vertically acting force, or a force having a major vertically acting component, upon the tubular support 22 at the coupling bracket 29. In the example which is being described, this mass is constituted by the seed drill 32 since that seed drill, during its progress in the direction A, constantly exerts upon the coupling bracket 29 a downwardly directed force having a major vertically acting component. The tubular support 22, the arms 8, the arm 26 and the tubular supporting beam 11 together constitute a supporting structure that is generally indicated by the reference 41 for the freely rotatable ground roller 15 and, since this supporting structure 41 will tend to pivot about the axis of rotation of the roller 15 as a result of the downwardly acting force exerted upon the coupling bracket 29, the leading ends of the arms 8 and 26 will tend to move upwardly where they are pivotally connected to the frame portion 1 thus exerting an upwardly directed force upon that frame portion 1 and the soil working members 3 which it rotatably carries. This upwardly directed force will accordingly tend to assist upward displacement of the soil working members 3 should the circumstances referred to above occur under which at least one soil working member 3 encounters an embedded obstacle that requires it to move upwardly to ride over that obstacle. If the soil working members 3 can readily move upwardly to avoid such a rarely encountered obstacle, then significant damage will often completely be avoided or will, at least, be much less serious than it might otherwise have been.

It is possible to reduce the effect of the mass which will assist the soil working members 3 in moving upwardly out of the ground by displacing the point of application of that mass to the supporting structure 41 forwardly from the position illustrated in FIG. 2 of the drawings towards the plane A—A. In practice, this may be done by moving the coupling bracket 29 closer to the plane A—A and it will be apparent that, when the coupling point is at, or very close to, the plane A—A, the torque tending to move the soil working member 3 upwardly out of the ground is reduced substantially to zero. It is possible to move the point of application of the downwardly directed force to a location that is in advance of the plane A—A relative to the direction A. Under these circumstances there will be a tendency for the soil working members 3 to be urged further downwardly into the ground and there are operating circumstances where this can be an advantage, for exmaple, when the implement has to cultivate very hard soil that is considerably resistant to the penetration of the tines 5. When working such soil, the tines 5 can tend to ride upwardly out of the ground without meeting an embedded rock or other obstacle and the application of additional force tending to press the soil working members 3 downwardly is effective in overcoming, or at least reducing, this tendency. Initial penetration of the tines 5 into very hard ground at, for example, the edge of a field in that condition is also facilitated.

Figure 4:
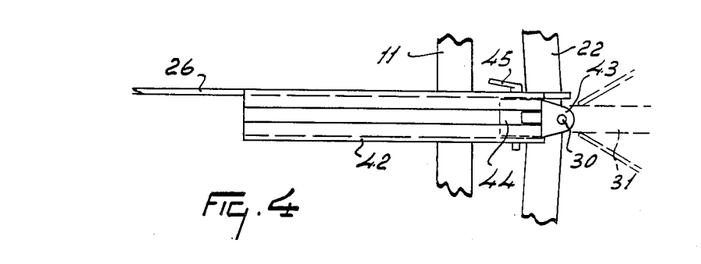
FIG. 4 is a plan view as seen in the direction indicated by an arrow IV in FIG. 3.

FIGS. 3 and 4 of the drawings illustrate an alternative contruction by which the point of application of a mass to the roller supporting structure at the rear of the soil cultivating implement can be varied. Parts which are similar, or identical, to parts that have already been described above with reference to FIGS. 1 and 2 of the drawings are indicated in FIGS. 3 and 4 by the same reference numbers as are employed in the former Figures and will not be described in detail again. The same is true in respect of another alternative embodiment that will be described below with reference to FIG. 5 of the drawings. A guideway 42 is arranged at one side of the upper edge of a rear region of the arm 26 so as to extend substantially horizontally parallel to the direction A and a slider 44 is movable lengthwise along the slideway 42 as desired, to one of a plurality of different desired positions, the slider 44 being provided with an upwardly and rearwardly directed coupling bracket 43 to which a lug at the leading end of the draw bar 31 of the seed drill 32 or some other mobile implement, machine or tool may be releasably and pivotably connected by the hitch pin 30. The slideway 42 has upright walls and a plurality of pairs of registering holes 46 are formed through those walls at regular intervals therealong. A horizontal locking pin 45 can be entered through any selected pair of aligned holes 46 in the walls of the slideway 42 and through an aligned single hole in the body of the slider 44 when that slider 44 is moved to a corresponding position lengthwise of the slideway 42. It will readily be apparent from FIGS. 3 and 4 of the drawings and from the description given above that the point of application of the mass to the roller supporting structure can quickly and easily be moved to any one of a number of locations that are to the rear of, in front of, or substantially at, the plane A—A by employing the structure shown in FIGS. 3 and 4 of the drawings which figures illustrate the slider 44 as being at the rearmost end of the slideway 42 with respect to the direction A. It is noted that, as can be seen in FIG. 3 of the drawings, the tubular support 22 is, in this embodiment, substantially horizontally disposed with the point of the shallow V rearmost relative to the direction A. This ensures that there is ample room for the draw bar 31 which may be of variable length and/or of a different construction to that which is diagrammatically illustrated.

Figure 5:
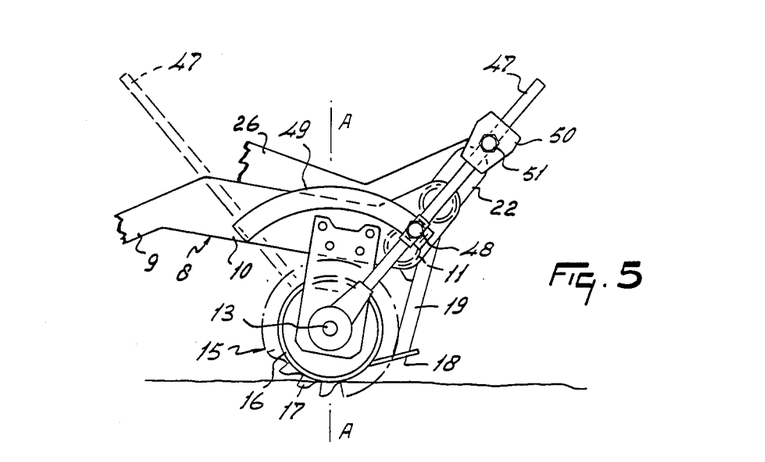
FIG. 5 is a similar view to that of FIG. 3 but illustrates a further alternative construction.

Instead of employing some associated mobile implement, machine or tool as the required mass, it is possible for that mass to be afforded by at least one weight and such an embodiment is illustrated in FIG. 5 of the drawings. Arms 47 are turnable about the stub shafts 13 at the opposite ends of the ground roller 15 to lie outwardly beyond the support plates 12. Each arm 47 carries a corresponding set bolt 48 and is movable along an arcuate guide 49 against which, by tightening the set bolt 48 concerned, said arm 47 can effectively be clamped to secure it for as long as may be required in a selected angular position about the longitudinal axis of the ground roller 15. As can be seen in FIG. 5 of the drawings, each arm 47 is movable effectively through an angle of substantially 90° around the longitudinal axis of the roller 15. When located centrally through the arc in which it is turnable around the axis of the roller 15, either arm 47 will be contained in, or be located very close to, the plane A—A. At least one weight 50 can be mounted on each arm 47, each weight 50, preferably as illustrated, being slidable lengthwise along that arm 47 and being provided with a clamping bolt 51 which can be tightened to secure it to the arm 47 at any selected position between the arcuate guide 49 concerned and the free end of the arm 47. The additional force which the mass will exert upon the soil working members 3 in either an upward or downward direction can thus be controlled in both magnitude and direction by retaining the arms 47 in appropriate positions about the longitudinal axis of the ground roller 15 and/or by increasing or decreasing the mass of the weights 50 and/or by increasing or decreasing the distance of those weights 50 along each arm 47 from the axis of the roller 15. If, for example, one of the arms 47 and the corresponding weight 50 are disposed as shown in full lines in FIG. 5 of the drawings, that weight 50 will act to tend to move the soil working members 3 upwardly out of the ground since it is well behind the plane A—A relative to the direction A. Although this arm 47 cannot be turned farther rearwardly about the axis of rotation of the roller 15, the illustrated weight 50 could be moved further upwardly along the arm 47 and/or a larger weight, or at least one further weight, could be employed. A weight of lower mass than the weight 50 could, of course, be substituted for that weight 50 as an alternative.

When the arm 47 that can be seen in FIG. 5 of the drawings is pivotally advanced with respect to the direction A, the weight 50 is similarly moved and its effect becomes progressively diminished as it approaches the plane A—A and, when its center of gravity coincides with that plane, it no longer has any effect at all as regards tending to move the frame portion 1 and soil working members 3 either upwardly or downwardly. As the weight 50 is moved forwardly of the plane A—A towards the position shown in broken lines in FIG. 5, a progressively increasing force tending to move the frame portion 1 and soil working members 3 downwardly towards the ground is produced and, as previously mentioned, this can be of considerable assistance when very hard soil is to be dealt with since it facilities initial penetration of the tines 5 or other soil working tools into the soil and tends to prevent them from riding up out of that soil during continuing progress in the direction A.

The weights 50 or other masses that are employed will also load the ground roller 15 and, if desired, this loading can be employed to control the pressure which the roller exerts upon the ground surface so that said pressure may be adapted as far as possible to the nature of the particular soil that is being dealt with and the existing condition of that soil. The relatively large axial spacing that is employed between the groups or crowns of blades 17 on the ground roller 15 makes it difficult for clods of earth, root remnants and other debris in the soil to become lodged between neighboring groups or crowns, it being possible for the effective operation of the roller to be considerably reduced if this should happen to any significant extent. Any exceptionally lodged clod of earth or other item will almost always quickly be shed from the roller by some of the scrapers 18. In addition to the spacing between the groups or crowns of roller blades 17 preferably being substantially the same as the spacing between the axes of rotation of neighboring soil working member shafts 2, it is also preferred that the spacing should be the same, or substantially the same, as the diameter of the cylinder 16 of the ground roller 15 which carries said groups or crowns of blades 17.

Although certain features of the soil cultivating implement embodiments described or illustrated or both in the accompanying drawings, will be set forth in the following claims as inventive features, it is emphasized that the invention is not necessarily limited to those features and may includes within its scope other inventive features that have been disclosed considered both individually and in various combinations.

We claim:

1. A soil cultivating implement comprising an elongated frame portion that is moveable over the ground and extends transverse to its intended direction of operative travel, a plurality of rotary soil working members carried by said frame portion in a successively neighboring relationship with one another, arm means freely pivotally connected at one end to a forward aspect of said frame portion and extending rearwardly from said frame portion, an adjustable stop and guide means at a rear aspect of said frame portion for limiting downward rotation of said frame portion, and a ground-roller disposed rearwardly of said soil working members relative to said direction of operative travel and also extending transverse to that direction, said ground-roller being attached to said arm means so as to provide a pivotal fulcrum for said arm means such that said arm means while pivotally sustaining said forward aspect of said frame portion relative to the ground surface during the implement's operation provides a vertically directed force to the forward aspect of said frame portion while permitting said frame portion rearward of the freely pivotal connection to move upwardly relative to said arm means, said arm means having an arm portion extending rearward of said ground-roller, said arm means, by means of a mass attached to said arm means and located at a distance from a vertical plane through the axis of rotation of said ground-roller, providing a selected vertical component of force, said selected vertical component of force exerting by way of said fulcrum created by said ground-roller a further vertical force, which may be positive or negative depending upon the selected vertical component of force, upon said forward aspect of said frame portion including said soil working members carried by said frame portion.

2. An implement according to claim 1, wherein said pivotal connections of said arm means to said frame portion define an axis which is located adjacent the forward aspect of said frame portion relative to the implement's intended direction of operative travel.

3. An implement according to claim 2 wherein said further vertical force is applied by said arm means at said axis adjacent the forward aspect of said frame portion with respect to the intended direction of the implement's operative travel.

4. An implement according to claim 3 wherein said arm means carried by said ground roller comprises at least two arms connected by a tubular support.

5. An implement according to claim 4 wherein said mass is constituted by at least one weight, said weight being adjustably attached to a weight arm, said weight arm being pivotally mounted at said axis of rotation of said ground roller and adjustably attached to one of said arms of said arm means so as to be displaceable in position relative to said vertical plane.

6. An implement according to claim 5 wherein said adjustable attachment of said weight arm which enables said weight to be displaced in position relative to said vertical plane is of such a construction that said weight can selectively occupy a position either in front of, or behind, said vertical plane relative to the implement's intended direction of operative travel.

7. An implement according to claim 6 wherein said pivotal mount at said axis of rotation of said ground roller of said weight arm permits said weight arm to be angularly displaceable along an arcuate guide attached to one of said arms of said arm means.

8. An implement according to claim 6 wherein said weight is displaceable lengthwise along said weight arm and said adjustable attachment of said weight to said weight arm provides means for retaining said weight in any selected position along said weight arm.

9. An implement according to claim 6, wherein said weight arm is adapted to carry an plurality of weights.

10. An implement according to claim 6 wherein said adjustable attachment of said weight arm to one of said arms of said arm means comprises a bracket mounted to one of said arms of said arm means, said weight arm being angularly adjustable along said bracket which subtends an angle of substantially 90 degrees relative to said axis.

11. An implement according to claim 3 wherein said soil working members are arranged so as to be power-driveable around corresponding substantially vertical axes and wherein the implement further comprises a coupling member constructed and arranged to be connected to the three-point lifting device of a tractor or other operating vehicle.

12. An implement according to claim 3 comprising a third arm and an adjustment means, said adjustment means mounted on said third arm wherein the location at which said mass is applied to said third arm is selectively adjustable to a plurality of different points relative to said vertical plane, said third arm lying in a plane parallel to said implement's operative direction of travel and to one side of such a plane dividing said implement into mirror images, one end of said third arm being pivotally attached along said axis adjacent the forward aspect of said frame portion and at the opposite end to said tubular support.

13. An implement according to claim 12 wherein said adjustment means enables said mass to act upon said frame portion at least one location that is in advance of said ground roller relative to the implement's intended direction of operative travel.

14. An implement according to claim 12 wherein said adjustment means comprises a slider and a slideway, said slider being adjustable in position lengthwise of a slideway that extends substantially parallel to the implement's intended direction of operative travel to a location in advance of said vertical plane.

15. An implement according to claim 3 wherein said mass is afforded by a further mobile implement that may be used in combination with the soil cultivating implement and be towed over the ground by the latter, the location at which said further implement's mass exerts its force upon the soil cultivating implement being afforded by a coupling point on said tubular support.

16. An implement according to claim 15, wherein said coupling point is located approximately centrally of said tubular support.

17. An implement according to claim 24, wherein said stop and guide means further comprises a guide formed with a plurality of relatively spaced holes that are located at different horizontal levels and into any one of said holes a locking pin stop can be entered to co-operate with the upper edge of the corresponding said arm.

18. A soil cultivating implement comprising an elongated frame portion that is moveable over the ground and extends in a direction which is transverse to its intended direction of operative travel, a plurality of rotary soil working members carried by said frame portion in a successively neighboring relationship with one another, arm means freely pivotally connected at one end to and extending rearwardly from a forward aspect of said frame portion, an adjustable stop and guide means at a rear aspect of said frame portion for limiting downward rotaton of said frame portion, and a supporting member having an axis of rotation disposed rearwardly of said soil working members relative to said direction of operative travel and also extending transverse to that direction, said supporting member being attached to said arm means so as to provide a pivotal fulcrum for said arm means such that said arm means while pivotally attached to said forward aspect of said frame portion also transfers a vertical force to said forward aspect while permitting said frame portion rearward of said pivotally attached forward aspect to move upwardly relative to said arm means, a discrete mass attached to said arm means at point away from said pivotal connection of said arm means to said frame portion to create a force having a vertical component, said mass being disposed at a location which is at a level higher than said axis of rotation of said supporting member, said mass exerting by way of said arm means and said supporting member said vertical component of force upon said forward aspect of said frame portion.

19. An implement according to claim 18 wherein the mass is located to the rear of a vertical plane containing the axis of rotation of said supporting member.

20. An implement according to claim 19 wherein said mass comprises an agricultural device which is attached to the rearward end of said arm means thereby creating a drag force having a major vertically component acting on said arm means.

21. An implement according to claim 20 wherein when said vertical acting component is a substantially downwardly acting component of force acting on said rearward end of said arm means such that it produces an upwardly acting component of force on said frame portion thereby assisting the upward displacement of said soil working members should at least one of said soil working members encounter on embedded obstacle in the soil being worked.

22. An implement according to claim 20 wherein said agricultural device is supported at least in part by ground engaging wheels.

23. An implement according to claim 1 wherein said mass comprises an agricultural device that is connected to said arm means, said agricultural device performing an agricultural operation associated with the soil worked by said soil working members.

24. An implement according to claim 23, wherein said agricultural device is supported in part by ground engaging wheels and in part by said arm means where it is connected thereto.

25. An implement according to claim 24, wherein said agricultural device comprises means for applying material to the soil worked by said soil working members.

* * * * *